(12) United States Patent
Mao et al.

(10) Patent No.: US 12,224,641 B2
(45) Date of Patent: Feb. 11, 2025

(54) VIBRATION DEVICE

(71) Applicant: AAC Microtech (Changzhou) Co., Ltd., Changzhou (CN)

(72) Inventors: Lubin Mao, Shenzhen (CN); Ziang Li, Shenzhen (CN); Jie Ma, Shenzhen (CN); Yun Tang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 270 days.

(21) Appl. No.: 18/073,460

(22) Filed: Dec. 1, 2022

(65) Prior Publication Data

US 2024/0072627 A1 Feb. 29, 2024

Related U.S. Application Data

(63) Continuation of application No. PCT/CN2022/116145, filed on Aug. 31, 2022.

(51) Int. Cl.
| | |
|---|---|
| *H02K 33/18* | (2006.01) |
| *G06F 3/01* | (2006.01) |
| *G06F 3/0354* | (2013.01) |
| *H02K 11/00* | (2016.01) |

(52) U.S. Cl.
CPC ......... *H02K 33/18* (2013.01); *G06F 3/03545* (2013.01); *H02K 11/0094* (2013.01); *G06F 3/016* (2013.01)

(58) Field of Classification Search
CPC ............... H02K 33/18; H02K 11/0094; G06F 3/03545; G06F 3/016
See application file for complete search history.

(56) References Cited

U.S. PATENT DOCUMENTS

| | | | |
|---|---|---|---|
| 10,596,593 B2* | 3/2020 | Huang | H02K 33/18 |
| 2010/0294574 A1* | 11/2010 | Chen | G06F 3/03545 |
| | | | 345/179 |
| 2023/0198362 A1* | 6/2023 | Hirata | H02K 33/02 |
| | | | 310/36 |

* cited by examiner

*Primary Examiner* — Christopher M Koehler
*Assistant Examiner* — Riley Owen Stout
(74) *Attorney, Agent, or Firm* — W&G Law Group

(57) ABSTRACT

The present disclosure discloses a vibration device includes a housing with a receiving space; and a vibration unit received in the receiving space, including an elastic support member; a stator fixed to the housing, including one of a coil and a magnet fixed to the housing; a vibrator suspended by the elastic support member, including the other of the coil and the magnet; and a battery suspended by the elastic support member; wherein the coil and the magnet interact to drive the vibrator to vibrate relative to the stator for generating haptic feedback. The vibration device in the present disclosure has higher space utilization rate and lower cost.

4 Claims, 4 Drawing Sheets

A-A

VIBRATION DEVICE

FIELD OF THE PRESENT DISCLOSURE

The present disclosure relates to haptic feedback technologies, especially relates to a vibration device for providing haptic feedback.

DESCRIPTION OF RELATED ART

With the development of haptic feedback technologies, touch panel served as input device is widely used in portable mobile terminals, such as mobile phone or tablets. Generally, users use fingers or stylus to operate the touch panels. Since the stylus can generate more detailed pictures or text, more and more users use stylus instead of fingers to operate the touch panel of the portable mobile terminals. In order to improve user's writing experience and immersion, a vibration motor is provided in the stylus to generate haptic feedback during touch operation.

In related art, the vibration motor is usually mounted in the stylus. However, due to the small size of the stylus, an individual vibration motor may occupy excessive space of the stylus and increase the cost of the stylus.

Therefore, it is necessary to provide an improved vibration device to overcome the problems mentioned above.

SUMMARY OF THE INVENTION

The present disclosure provides a vibration device with higher space utilization rate and lower cost.

The vibration device includes a housing with a receiving space; and a vibration unit received in the receiving space, including: an elastic support member; a stator fixed to the housing, including one of a coil and a magnet fixed to the housing; a vibrator suspended by the elastic support member, including: the other of the coil and the magnet; and a battery suspended by the elastic support member; wherein the coil and the magnet interact to drive the vibrator to vibrate relative to the stator for generating haptic feedback.

Further, the elastic support member includes a bottom plate fixed to the battery, a first fixation portion bending and extending from an edge of the bottom plate, a first elastic portion extending from one end of the first fixation portion, a second elastic portion extending from the other end of the first fixation portion, and a first connection portion connecting the first elastic portion and the second elastic portion; the first connection portion is arranged opposite the first fixation portion; the first fixation portion, the first elastic portion, the second elastic portion, and the first connection portion surrounds the battery, the first connection portion is fixed to the housing for suspending the elastic support member in the receiving house.

Further, the bottom plate is in a rectangle shape, the first fixation portion and the first connection portion extend along a long axis of the bottom plate, respectively; the first elastic portion and the second elastic portion extend along a short axis of the bottom plate, respectively.

Further, the first elastic portion, the second elastic portion, and the first connection portion are spaced apart from the bottom plate.

Further, the first elastic portion includes a first elastic arm connecting with the first fixation portion, a second elastic arm connecting with the first connection portion, and a connection arm connecting the first elastic arm and the second elastic arm; the elastic support member further includes a second fixation portion bending and extending from the connection arm to be fixed to the housing.

Further, the elastic support member further includes a second connection portion connecting the bottom plate and the first fixation portion; a length of the second connection portion along the long axis of the bottom plate is smaller than a length of the bottom plate along its long axis.

Further, the battery includes a side surface spaced apart from the first elastic portion, the magnet is attached to the side surface, the coil is fixed to a side of the connection arm facing the magnet, the coil and the magnet are arranged at an interval.

Further, the coil is annular; the magnet extends into the coil along a vibration direction of the vibrator.

Further, the vibration device is a stylus.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
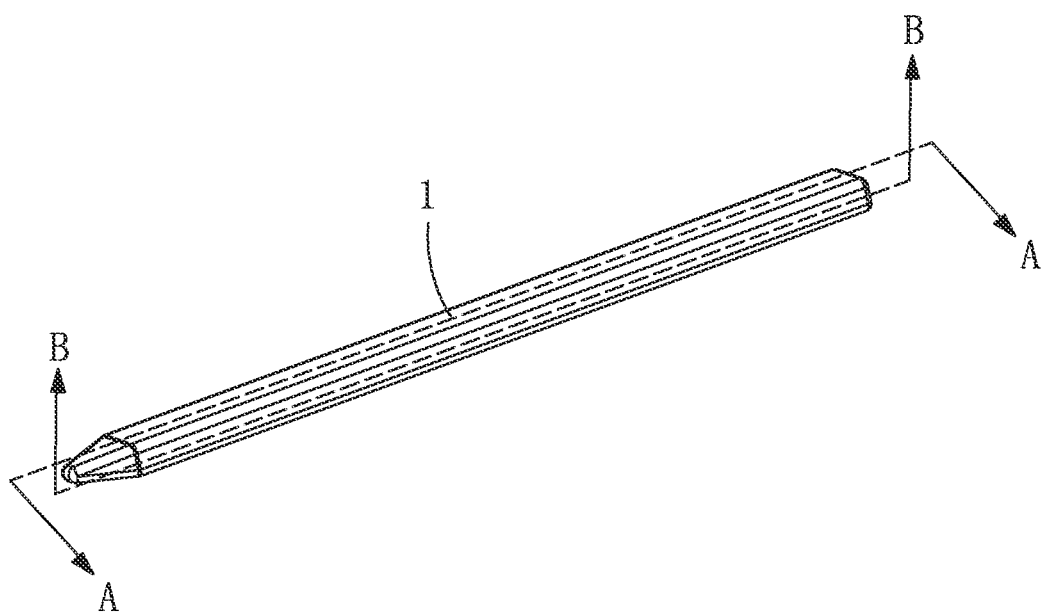
FIG. 1 is an isometric view of a vibration device in accordance with an exemplary embodiment of the present disclosure.
Figure 2:
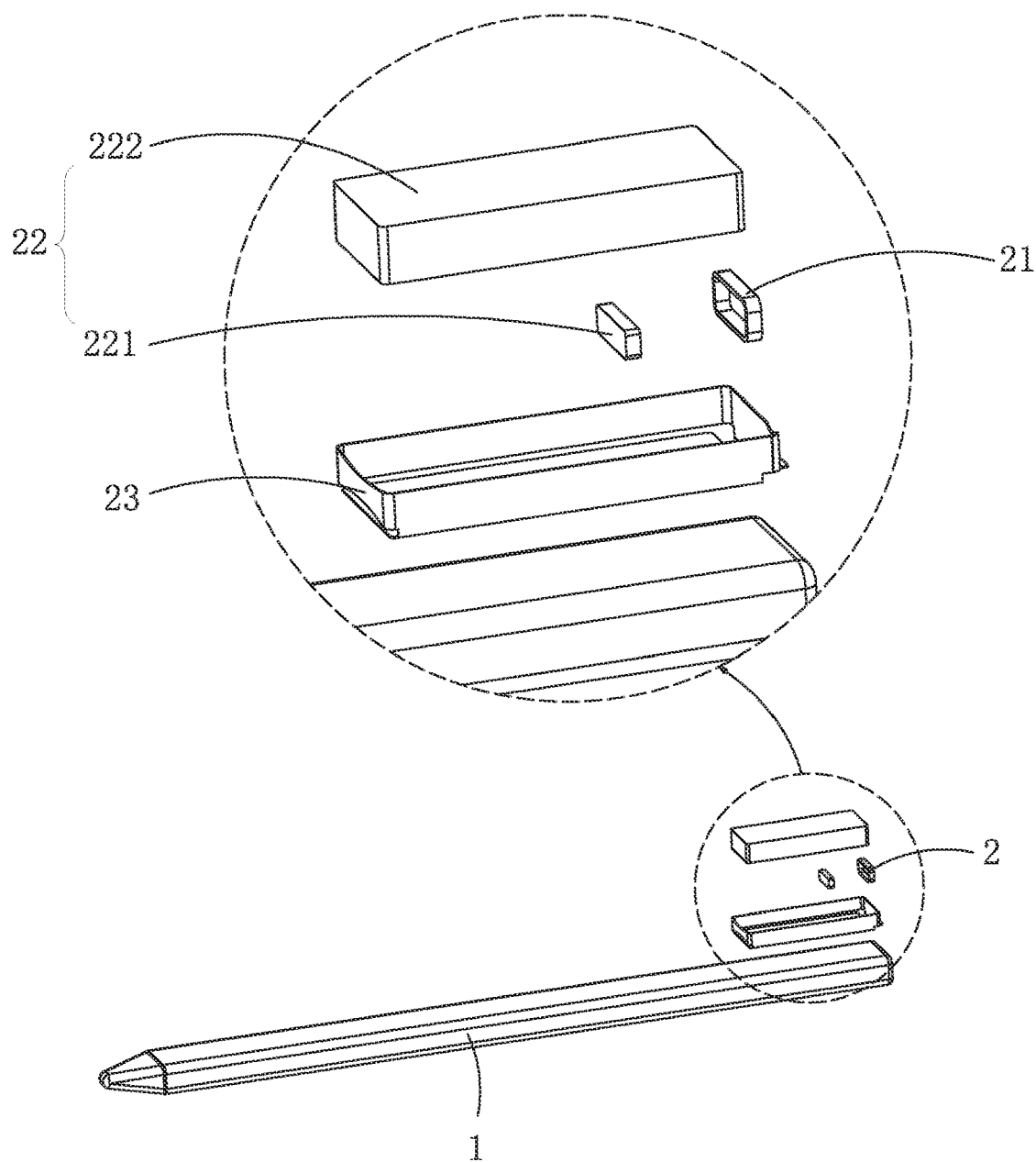
FIG. 2 is an exploded view of the vibration device in FIG. 1.
Figure 3:
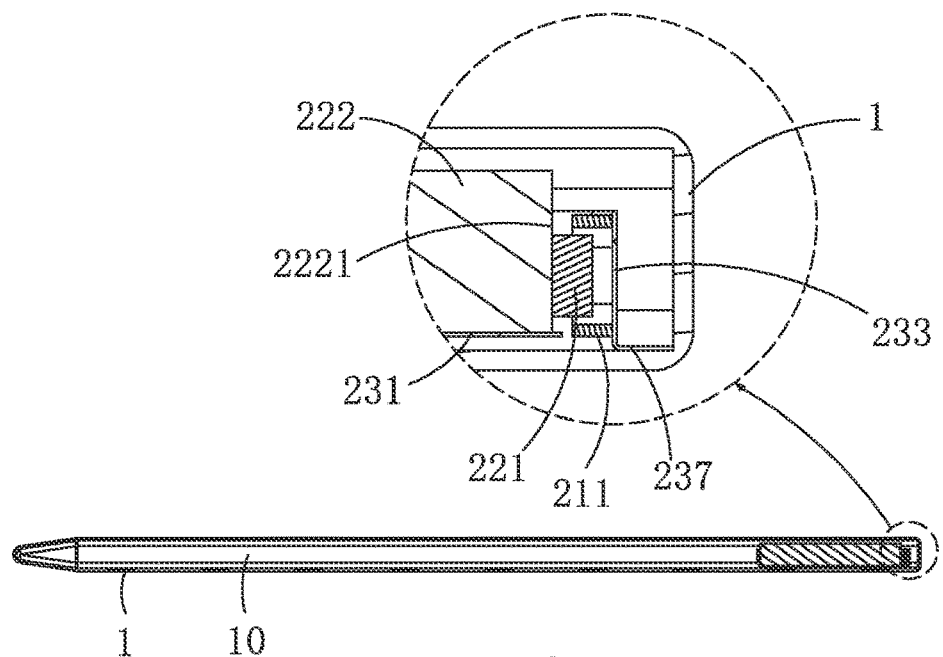
FIG. 3 is a cross-sectional view of the vibration device taken along line A-A in FIG. 1.
Figure 4:
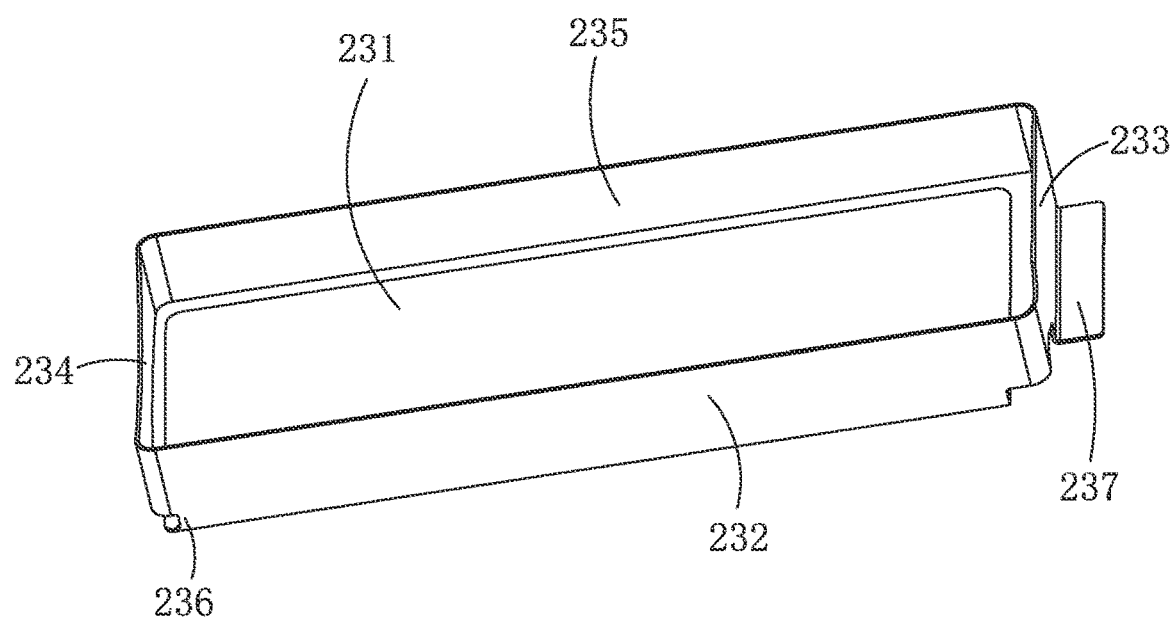
FIG. 4 is an isometric view of an elastic support member of the vibration device in FIG. 1.
Figure 5:
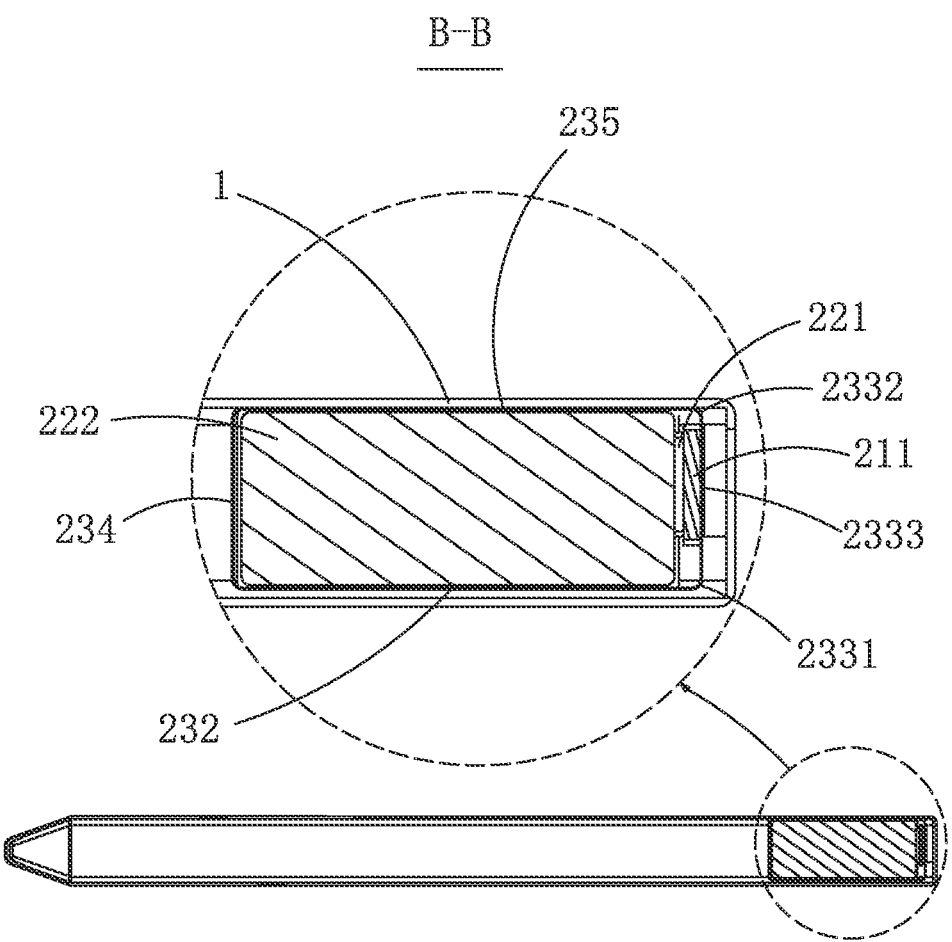
FIG. 5 a cross-sectional view of the vibration device taken along line B-B in FIG. 1.

Please refer to FIGS. 1-5 together, a vibration device 100 provided by an exemplary embodiment of the present disclosure includes a housing 1 with a receiving space 10 and a vibration unit 2 received in the receiving space 10.

The vibration unit 2 includes a stator 21 fixed to the housing 1, a vibrator 22 suspended in the receiving space 10, and an elastic support member 23 configured to suspend the vibrator 22 in the receiving space 10. In one embodiment, the stator 21 includes a coil 211 fixed to the housing 1, and the vibrator 22 includes a magnet 221. The coil 211 and the magnet 221 interact to drive the vibrator 22 to vibrate relative to the stator 21 for generating haptic feedback. It can be understood that the coil 211 and the magnet 221 can interchange. Moreover, the vibrator 22 further includes a battery 222 suspended by the elastic support member 23. The battery 222 is served as mass to vibrate for generating desired haptic feedback. Generally, the weight of the battery is larger than the weight of a normal mass in the vibration motor. In this manner, no extra mass component is needed, thus effectively improving the space utilization rate of the vibration device and reducing cost.

The elastic support member 23 includes a bottom plate 231 fixed to the battery 222, a first fixation portion 232 bending and extending from an edge of the bottom plate 231, a first elastic portion 233 extending from one end of the first fixation portion 232, a second elastic portion 234 extending from the other end of the first fixation portion 232, and a first connection portion 235 connecting the first elastic portion 233 and the second elastic portion 234; the first connection portion 235 is arranged opposite the first fixation portion 232; the first fixation portion 232, the first elastic portion 233, the second elastic portion 234, and the first connection portion 235 surrounds the battery 222, the first connection portion 235 is fixed to the housing 1 for suspending the elastic support member 23 in the receiving house 10.

Specifically, the bottom plate 231 is in a rectangle shape, the first fixation portion 232 and the first connection portion 235 extend along a long axis of the bottom plate 231, respectively; the first elastic portion 233 and the second elastic portion 234 extend along a short axis of the bottom plate 231, respectively. In order to drive the vibrator 22 to vibrate back and forth by the deforming the first elastic portion 233 and the second elastic portion 234, the first elastic portion 233, the second elastic portion 234, and the first connection portion 235 are all spaced apart from the bottom plate 231. In addition, the elastic support member 23 further includes a second connection portion 236 connecting the bottom plate 231 and the first fixation portion 232; a length of the second connection portion 236 along the long axis of the bottom plate 231 is smaller than a length of the bottom plate 231 along its long axis.

Furthermore, the first elastic portion 233 includes a first elastic arm 2331 connecting with the first fixation portion 232, a second elastic arm 2332 connecting with the first connection portion 235, and a connection arm 2333 connecting the first elastic arm 2331 and the second elastic arm 2332; the elastic support member 23 further includes a second fixation portion 237 bending and extending from the connection arm 2333 to be fixed to the housing 1. Thus, only the second elastic portion 234, the first elastic arm 2331, and the second elastic arm 2332 deforms during vibration. The second connection portion 236 and the connection arm 2333 do not deform.

In one embodiment, the battery 222 includes a side surface 2221 spaced apart from the first elastic portion 233, the magnet 221 is attached to the side surface 2221, the coil 211 is fixed to a side of the connection arm 2333 facing the magnet 221, the coil 211 and the magnet 221 are arranged at an interval. In order to improve the drive force generated by the coil 211 and the magnet 221 to enhance the haptic feedback of the vibrator unit 2, the magnet 221 extends into the coil 211 along a vibration direction of the vibrator 22. It can be understood that the coil 211 is annular with a hollow structure.

In this embodiment, the vibration device 100 is a stylus. In other embodiments, the vibration device can be other portable mobile terminals with battery, such as watch.

Compared with the related art, in the vibration device of the present disclosure, a battery is served as mass to vibrate generating desired haptic feedback, which effectively enhances the vibration feedback by increasing the mass weight. Furthermore, no extra mass component is needed, thus effectively improving the space utilization rate of the vibration device and reducing cost.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration device comprising:
    a housing with a receiving space; and
    a vibration unit received in the receiving space, comprising:
        an elastic support member;
        a stator fixed to the housing, comprising a coil fixed to the housing;
        a vibrator suspended by the elastic support member, comprising:
            a magnet; and
            a battery suspended by the elastic support member;
        wherein the coil and the magnet interact to drive the vibrator to vibrate relative to the stator for generating haptic feedback;
        the elastic support member comprises a bottom plate fixed to the battery, a first fixation portion bending and extending from an edge of the bottom plate, a first elastic portion extending from one end of the first fixation portion, a second elastic portion extending from the other end of the first fixation portion, and a first connection portion connecting the first elastic portion and the second elastic portion; the first connection portion is arranged opposite the first fixation portion; the first fixation portion, the first elastic portion, the second elastic portion, and the first connection portion surrounds the battery, the first connection portion is fixed to the housing for suspending the elastic support member in the receiving house;
        the bottom plate is in a rectangle shape, the first fixation portion and the first connection portion extend along a long axis of the bottom plate, respectively; the first elastic portion and the second elastic portion extend along a short axis of the bottom plate, respectively;
        the first elastic portion, the second elastic portion, and the first connection portion are spaced apart from the bottom plate;
        the first elastic portion comprises a first elastic arm connecting with the first fixation portion, a second elastic arm connecting with the first connection portion, and a connection arm connecting the first elastic arm and the second elastic arm; the elastic support member further comprises a second fixation portion bending and extending from the connection arm to be fixed to the housing;
        the elastic support member further comprises a second connection portion connecting the bottom plate and the first fixation portion; a length of the second connection portion along the long axis of the bottom plate is smaller than a length of the bottom plate along its long axis.

2. The vibration device as described in claim 1, wherein the battery comprises a side surface spaced apart from the first elastic portion, the magnet is attached to the side surface, the coil is fixed to a side of the connection arm facing the magnet, the coil and the magnet are arranged at an interval.

3. The vibration device as described in claim 2, wherein the coil is annular; the magnet extends into the coil along a vibration direction of the vibrator.

4. The vibration device as described in claim 3, wherein the vibration device is a stylus.

* * * * *